(12) United States Patent
Shimizu et al.

(10) Patent No.: US 10,717,260 B2
(45) Date of Patent: Jul. 21, 2020

(54) MANUFACTURING METHOD OF LAMINATED STRUCTURE, LAMINATED STRUCTURE AND ELECTRONIC DEVICE

(71) Applicant: Sony Corporation, Tokyo (JP)

(72) Inventors: Keisuke Shimizu, Kanagawa (JP); Nozomi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 843 days.

(21) Appl. No.: 14/408,494

(22) PCT Filed: May 30, 2013

(86) PCT No.: PCT/JP2013/065046
§ 371 (c)(1),
(2) Date: Dec. 16, 2014

(87) PCT Pub. No.: WO2014/007003
PCT Pub. Date: Jan. 9, 2014

(65) Prior Publication Data
US 2015/0151528 A1 Jun. 4, 2015

(30) Foreign Application Priority Data
Jul. 5, 2012 (JP) .................................. 2012-151207

(51) Int. Cl.
*B32B 9/00* (2006.01)
*B32B 38/00* (2006.01)
(Continued)

(52) U.S. Cl.
CPC ............ *B32B 38/0008* (2013.01); *B32B 7/12* (2013.01); *B32B 9/007* (2013.01); *B32B 9/045* (2013.01);
(Continued)

(58) Field of Classification Search
CPC ............ C01B 31/0438; C01B 31/0446; C01B 2204/00; B82Y 30/00
(Continued)

(56) References Cited

U.S. PATENT DOCUMENTS

| | | | | |
|---|---|---|---|---|
| 5,461,087 A | * | 10/1995 | Takahashi | .................. B32B 7/12 522/80 |
| 2002/0039651 A1 | * | 4/2002 | Murata | ..................... B32B 7/12 428/354 |

(Continued)

FOREIGN PATENT DOCUMENTS

| | | |
|---|---|---|
| JP | 2009-298683 | 12/2009 |
| JP | 2012-140308 | 7/2012 |
| WO | 2011/046415 | 4/2011 |

OTHER PUBLICATIONS

International Search Report issued in connection with International Patent Application Serial No. PCT/JP2013/065046, dated Sep. 3, 2013. (3 pages).

(Continued)

*Primary Examiner* — Daniel H Miller
(74) *Attorney, Agent, or Firm* — Chip Law Group

(57) ABSTRACT

Provided is a manufacturing method of a laminated structure including a step of bonding a single layer or multiple layers of graphene formed on a first substrate to a second substrate through an adhesive layer including a delayed-curing UV curable resin by a roll-to-roll process.

16 Claims, 20 Drawing Sheets

(51) Int. Cl.
| | |
|---|---|
| *B32B 37/12* | (2006.01) |
| *B32B 9/04* | (2006.01) |
| *B32B 15/20* | (2006.01) |
| *B32B 27/16* | (2006.01) |
| *B32B 15/08* | (2006.01) |
| *B32B 7/12* | (2006.01) |
| *B32B 37/00* | (2006.01) |
| *B32B 38/10* | (2006.01) |
| *H01B 1/18* | (2006.01) |
| *B32B 37/20* | (2006.01) |

(52) U.S. Cl.
CPC .............. *B32B 15/08* (2013.01); *B32B 15/20* (2013.01); *B32B 27/16* (2013.01); *B32B 37/0053* (2013.01); *B32B 37/025* (2013.01); *B32B 37/12* (2013.01); *B32B 38/10* (2013.01); *H01B 1/18* (2013.01); *B32B 37/20* (2013.01); *B32B 2037/1253* (2013.01); *B32B 2038/0076* (2013.01); *B32B 2250/02* (2013.01); *B32B 2255/10* (2013.01); *B32B 2255/20* (2013.01); *B32B 2255/28* (2013.01); *B32B 2307/202* (2013.01); *B32B 2307/412* (2013.01); *B32B 2310/0831* (2013.01); *B32B 2311/00* (2013.01); *B32B 2313/04* (2013.01); *B32B 2457/00* (2013.01); *B32B 2457/20* (2013.01); *Y10T 428/30* (2015.01)

(58) Field of Classification Search
USPC .......................................... 428/408; 443/448
See application file for complete search history.

(56) References Cited

U.S. PATENT DOCUMENTS

| | | | |
|---|---|---|---|
| 2006/0099809 A1* | 5/2006 | Kainuma | H01L 21/563 |
| | | | 438/685 |
| 2011/0123776 A1 | 5/2011 | Shin et al. | |
| 2012/0114934 A1* | 5/2012 | Kodama | H01L 24/29 |
| | | | 428/336 |
| 2012/0258311 A1 | 10/2012 | Hong et al. | |
| 2012/0282419 A1* | 11/2012 | Ahn | B82Y 30/00 |
| | | | 428/34.8 |

OTHER PUBLICATIONS

Sukang Bae et al., "Roll-to-roll production of 30-inch graphene films for transparent electrodes", Nature Nanotechnology Letters, vol. 5, Aug. 2010, published online Jun. 20, 2010. (5 pages).

* cited by examiner

MANUFACTURING METHOD OF LAMINATED STRUCTURE, LAMINATED STRUCTURE AND ELECTRONIC DEVICE

CROSS REFERENCES TO RELATED APPLICATIONS

The present application is a national stage of International Application No. PCT/JP2013/065046 filed on May 30, 2013 and claims priority to Japanese Patent Application No. 2012-151207 filed on Jul. 5, 2012, the disclosure of which is incorporated herein by reference.

BACKGROUND

The present disclosure relates to a manufacturing method of a laminated structure, a laminated structure and an electronic device, and is preferably applied to, for example, a transparent conductive film used in a display and a touch panel as well as various electronic devices each including a transparent conductive film.

Graphene, which includes a single layer of carbon atoms of graphite, is expected as a transparent conductive material or a wiring material because of its high conductivity. Especially, graphene synthesized by a thermal CVD method attracts attention in that a film can be formed in a large area while the number of layers can be controlled.

In the synthesis method of graphene by the thermal CVD method, graphene is formed on a metal catalyst substrate, typically on a copper foil. Accordingly, the formed graphene needs to be transferred from the metal catalyst substrate onto a desired substrate.

As a transfer method of graphene known to the inventors, the transfer method using polymethyl methacrylate (PMMA), the transfer method using a thermal release tape, and the like have been reported (for example, see Non-Patent Literature 1).

Also, as another transfer method of graphene known to the inventors, there has been proposed the method of forming a graphene sheet on a carbonization catalyst film, forming a binder layer to this graphene sheet, bonding a substrate to the binder layer, and dipping these in an acid solution to remove the carbonization catalyst film (see Patent Literature 1).

Incidentally, as represented by the case where a flexible print substrate (FPC) is manufactured, when a metal foil and a film substrate are bonded together by a roll-to-roll process, an adhesive including a thermosetting resin is usually used. This is because while the use of an adhesive including a UV curable resin causes adhesion to a metal foil to become extraordinarily low and bonding itself to be difficult, the adhesive including a thermosetting resin enables a metal foil and a flexible film substrate to be tightly bonded together.

It is considered that the reasons why the adhesive including a thermosetting resin can achieve high adhesive strength even to the metal foil is that the hardness of the thermosetting resin is not considerably high, and that a curing process is performed after bonding and winding-up.

On the contrary, when the adhesive including an UV curable resin is used, a curing process with UV exposure is performed immediately after bonding, and winding-up is performed after the curing. In this case, the hardness of the adhesive layer rapidly increases in a state where the laminated structure of metal foil/adhesive layer/film substrate is bent and applied with tension. Therefore, the metal foil and the film substrate each having a different hardness cannot be maintained in a state of being bonded together, thereby causing peeling.

On the other hand, when the adhesive including a thermosetting resin is used, the adhesive is flexible until being wound up. Therefore, even when bent and applied with tension, the adhesive layer deforms to relax its stress, and furthermore strong adhesiveness still remains in the adhesive layer during wound-up. Accordingly, peeling is not likely to be caused. In this manner, when the metal foil and the flexible film substrate are bonded to each other by a roll-to-roll process, it is considered that the adhesive including a thermosetting resin is suitable.

Here, in order to manufacture a transparent conductive film including graphene in a large area and with high throughput, a graphene-added metal foil synthesized into a roll shape needs to be bonded to a transparent resin film and the like by a roll-to-roll process. When the graphene-added metal foil and the transparent resin film are bonded to each other per piece, a force in a bending direction or the like is not applied to the film after bonding. Therefore, when the both are only slightly bonded, a transparent resin film can be manufactured by removing the metal foil by etching or the like.

In a case where the transparent conductive film including graphene is manufactured by a roll-to-roll process as described above, it is conceivable that when bonding the graphene-added metal foil to the transparent conductive film or the like, the adhesive including a thermosetting resin is used as in the case of manufacturing a flexible print substrate. However, the thermosetting resin has problems in that (1) the curing requires warming for an extended period, and (2) since a solvent drying process is generally required, an extensive apparatus is required. To solve these problems, it is desirable that the bonding be performed using the adhesive including a UV curable resin.

CITATION LIST

Patent Literature

Patent Literature 1: JP 2009-298683A

Non-Patent Literature

Non-Patent Literature 1: S. Bae, et al., Nature Nanotechnology 5, 574 (2010)

SUMMARY

Technical Problem

However, in a case where the adhesive including a UV curable resin is used to bond the graphene-added metal foil and the transparent resin film as described above, a winding tension is applied after this adhesive including a UV curable resin is cured by UV exposure. In addition, the winding-up is performed after passing guide rollers each having a roll part. Therefore, the bonded materials can be peeled off during feeding unless the bonding strength is extremely high.

According to an embodiment of the present disclosure, there is provided the manufacturing method of a laminated structure and the laminated structure, which enable the laminated structure such as a transparent conductive film including graphene to be manufactured by a roll-to-roll process with high throughput while inhibiting peeling of the layers constituting the laminated structure.

According to an embodiment of the present disclosure, there is also provided a high performance electronic device that includes the laminated structure including graphene as a transparent conductive film.

Solution to Problem

In order to solve the above problems, according to the present disclosure, there is provided a manufacturing method of a laminated structure including a step of bonding a single layer or multiple layers of graphene formed on a first substrate to a second substrate through an adhesive layer including a delayed-curing UV curable resin by a roll-to-roll process.

Further, according to the present disclosure, there is provided a laminated structure manufactured by executing a step of bonding a single layer or multiple layers of graphene formed on a first substrate to a second substrate through an adhesive layer including a delayed-curing UV curable resin by a roll-to-roll process.

Further, according to the present disclosure, there is provided an electronic device including a laminated structure manufactured by executing a step of bonding a single layer or multiple layers of graphene formed on a first substrate to a second substrate through an adhesive layer including a delayed-curing UV curable resin by a roll-to-roll process.

In the present disclosure, the graphene formed on a first substrate and the adhesive layer formed on a second substrate may be bonded to each other, or the adhesive layer formed on graphene formed on a first substrate and the second substrate may be bonded to each other. After forming a laminated structure by bonding the graphene formed on a first substrate to the adhesive layer formed on a second substrate, or by bonding the adhesive layer formed on graphene formed on a first substrate to the second substrate as described above, the adhesive layer is irradiated with UV rays for performing exposure. The irradiation energy density, irradiation time, wavelength and the like of the UV rays are appropriately selected depending on the delayed-curing UV curable resin used and the like. In this case, since the adhesive layer includes a delayed-curing UV curable resin, curing does not start immediately after the irradiation with UV rays, and the curing terminates in a certain period of time after the irradiation of UV rays. The time from the irradiation with UV rays to the start of curing can be determined by the composition control of the delayed-curing UV curable resin. The thickness of the adhesive layer is selected as necessary. An example of the thickness is not less than 1 µm and not more than 30 µm.

Regarding the adhesive layer, after forming the laminated structure by bonding in the above-described manner, the curing of the adhesive layer is configured not to terminate during a period from the irradiation of the adhesive layer with UV rays to at least the winding-up of the laminated structure into a roll. Here, the termination of the curing of the adhesive layer means curing of more than 80% of the adhesive layer.

In order to inhibit the curing of the adhesive layer from terminating before the laminated structure is wound up into a roll, the adhesive layer has, for example, a time from the irradiation of the adhesive layer with UV rays to the termination of the curing of the adhesive layer of not less than 10 seconds, preferably not less than 1 minute, and usually within 168 hours (one week). These times are calculated in consideration of the general intensity of a lamp used for generating UV rays (for example, 160 W/cm$^2$), the line rate for feeding a laminated structure (for example, 50 m/minute), the exposure amount necessary for the start of the curing of a delayed-curing UV curable resin (for example, 300 to 500 mJ), and the like.

For example, the delayed-curing UV curable resin contains at least one of (A), (B), and (C) below:

(A) a cationic polymerization-type UV curable resin (B) a radical polymerization-type UV curable resin containing at least one of a thermosetting resin and a cationic polymerization-type UV curable resin (C) a semi-curing radical polymerization-type UV curable resin.

The cationic polymerization-type UV curable resin of (A) has a polymerization reaction rate that is lower than the radical polymerization-type UV curable resin, and has a controllable reaction time. Therefore, the curing of the adhesive layer can be easily inhibited from terminating before the termination of winding-up. The cationic polymerization-type UV curable resin is generally epoxy resin-based.

The radical polymerization-type UV curable resin containing at least one of a thermosetting resin and a cationic polymerization-type UV curable resin of (B) is as below. That is, since the radical polymerization-type UV curable resin has a high reaction rate, the curing of the adhesive layer including only this radical polymerization-type UV curable resin is hardly inhibited from terminating before the termination of the winding-up of the laminated structure. To address this concern, in order to inhibit complete curing with only UV rays, another resin needs to be contained in the radical polymerization-type UV curable resin, so that the contained resin is lastly cured. As such another resin, at least one of a thermosetting resin and a cationic polymerization-type UV curable resin can be used. This radical polymerization-type UV curable resin is generally acrylic resin-based, and specifically, for example, epoxy-modified acrylate, urethane-modified acrylate, and silicone-modified acrylate.

In the present disclosure, from the viewpoint of inhibiting the occurrence of defects in graphene during bonding in order to improve the quality of graphene, the volatile matter content in the adhesive layer is preferably less than 1% by weight, more preferably not more than 0.5% by weight, further preferably not more than 0.1% by weight. In one typical example, the second substrate or the graphene formed on a first substrate is coated with an adhesive layer having a volatile matter content of less than 1% by weight and having adhesiveness. In another example, the second substrate or the graphene formed on a first substrate is coated with an adhesive layer containing at least not less than 1% by weight of a volatile matter and having adhesiveness, and thereafter this adhesive layer is dried to remove the volatile matter, thereby to form an adhesive layer having a volatile matter content of less than 1% by weight and having adhesiveness. Although the adhesive layer having a volatile matter content of less than 1% by weight and having adhesiveness preferably has fluidity at room temperature, the adhesive layer may have fluidity in a heating state. In such a case, the bonding between the graphene formed on a first substrate and the second substrate is performed in a heating state.

The first substrate and the second substrate are selected as necessary. Especially as the second substrate, a desired substrate is used depending on the application of graphene and the like. The first substrate is typically a metal foil, and preferably a copper foil. The second substrate is typically a transparent substrate.

Incidentally, the transfer method of graphene disclosed in Patent Literature 1 has the following problem. That is, when using a copper foil which is often used as a substrate in synthesizing graphene, heating at high temperature is required during the synthesis of graphene, making it difficult to inhibit the formation of unevenness on the surface of the copper foil under the influence of recrystallization or the like. For this reason, a binder layer used for transfer also transfers the surface shape of the copper foil on the surface of graphene at the same time as the graphene, causing the shape to remain even after removing the copper foil. As a result, large roughness exists on the surface of the transferred graphene. For this reason, the use of this graphene in a transparent conductive film causes the increase in the haze value which is important as the characteristics of the transparent conductive film. To solve this problem, it is effective to form a transparent layer on the graphene after removing the first substrate. When this laminated structure is used as a transparent conductive film, the haze value can be drastically reduced. This transparent layer may be basically formed of any material as long as it is a material that is transparent to visible light. The transparent layer to be used may be formed of various transparent resins. Examples of the transparent resins may include polyethylene terephthalate, polyethylene naphthalate, polycarbonate, polystyrene, polyethylene, polypropylene, polyphenylene sulfide, polyvinylidene fluoride, acetyl cellulose, phenoxy bromide, aramids, polyimides, polystyrenes, polyarylates, polysulfones, and polyolefins. The surface of the transparent layer is preferably formed to be sufficiently flat. The thickness of the transparent layer is appropriately selected depending on the application of the laminated structure, but is preferably selected to be the thickness that can sufficiently fill the unevenness formed on the surface of graphene and also provide a sufficiently flat surface.

The refractive indexes of the adhesive layer and the transparent layer described above are appropriately selected so as to inhibit the increase in the haze value due to the generation of unnecessary reflection interface in the whole laminated structure and to improve the transmittance of the laminated structure. Here, the light reflectivity of the interface where the substances having different refractive indexes are in contact with each other will be described. This reflectivity is represented by the following Fresnel equation:

$$R(\%) = ((n-n')/(n+n'))^2 \times 100.$$

In the equation, R is reflectivity; and n and n' are refractive indexes of the substances. The refractive indexes of the adhesive layer and the transparent layer described above are preferably determined in consideration of the reflectivity of all interfaces in the laminated structure calculated using this Fresnel equation. For example, the refractive index of the transparent layer and the refractive index of the adhesive layer may be substantially equal to each other. For example, the difference between the refractive index of the transparent layer and the refractive index of the adhesive layer are preferably not more than 0.3, more preferably not more than 0.2, and further preferably not more than 0.1. Here, as an example, the interface between the adhesive layer and the second substrate is considered. The second substrate is assumed to include polyethylene terephthalate (PET) which is assumed to have a refractive index of approximately 1.57.

Table 1 illustrates the calculation results of the value of the reflectivity to the value of the refractive index of the adhesive layer at this time.

TABLE 1

| Refractive index of PET | Refractive index of resin layer | Difference in refractive index | Reflectivity R (%) |
|---|---|---|---|
| 1.57 | 1.52 | 0.05 | 2.618322 |
| 1.57 | 1.62 | 0.05 | 2.4567369 |
| 1.57 | 1.47 | 0.1 | 10.8206371 |
| 1.57 | 1.67 | 0.1 | 9.5259869 |
| 1.57 | 1.37 | 0.2 | 46.2770142 |
| 1.57 | 1.77 | 0.2 | 35.8564309 |

From Table 1, it is understood that when the difference in the refractive index between PET and the adhesive layer is not more than 0.1, the reflectivity is not more than approximately 0.1%; and when the difference in the refractive index is not more than 0.05, the reflectivity is not more than approximately 0.025%, indicating almost no reflection.

Also, when the transparent layer which is the top layer is in contact with the air, the interface between this transparent layer and the air can be a reflection interface. When a transparent body is further disposed on the transparent layer, and the transparent body is in contact with the air, the interface between this transparent body and the air can be a reflection interface. In this case, the haze value can be inhibited from increasing to improve the transmittance, by using a transparent layer or a transparent body to be in contact with the air each having a refractive index closer to the refractive index of the air (for example, nafion having a refractive index of 1.38), or by disposing, for example, a reflection preventing film including a multilayer film on a side of the air.

Table 2 illustrates the calculation results of the value of the reflectivity to the value of the refractive index of the transparent layer or the transparent body based on an air refractive index of 1.

TABLE 2

| Refractive index of air | Refractive index of transparent layer or transparent body | Difference in refractive index | Reflectivity R (%) |
|---|---|---|---|
| 1 | 1.05 | 0.05 | 0.0594884 |
| 1 | 1.1 | 0.1 | 0.22675737 |
| 1 | 1.2 | 0.2 | 0.826446281 |
| 1 | 1.3 | 0.3 | 1.701323251 |
| 1 | 1.4 | 0.4 | 2.777777778 |
| 1 | 1.5 | 0.5 | 4 |

From Table 2, it is understood that when the difference in the refractive index between the transparent layer or the transparent body and the air is not more than 0.1, the reflectivity is not more than approximately 0.23%; and when the difference in the refractive index is not more than 0.05, the reflectivity is not more than approximately 0.06%, indicating almost no reflection.

The manufacturing method of a laminated structure further includes, as necessary, a process of forming, on the transparent layer, another layer, for example, at least one selected from the group consisting of a reflection preventing layer, an anti-glare layer, a hard coat layer and an antifouling layer. As necessary, on the back surface of the second substrate (the main surface of the second substrate on the opposite side to the graphene), at least one selected from the group consisting of a reflection preventing layer, an antiglare layer, a hard coat layer and an antifouling layer may be formed. Also, in some situations, the adhesive layer may have a function of a reflection preventing layer. Also, the manufacturing method of a laminated structure further has, as necessary, a process of bonding the laminated structure to a transparent substrate (for example, a glass substrate and a film), a display and the like.

Although the application of the laminated structure in which graphene and a second substrate are bonded together through an adhesive layer is not particularly limited, the laminated structure can be preferably used as a transparent conductive film, for example, a transparent conducting film or a transparent conducting sheet. In this case, as the second substrate, a transparent substrate that is transparent to visible light is used. This transparent conductive film can be used in various electronic devices. Specific examples of the electronic device include displays such as a liquid crystal display (LCD) and an organic electroluminescence display (an organic EL display), as well as a touch panel. The application of the transparent conductive film is also not limited. The transparent conductive film can be used as, for example, a transparent electrode of a solar cell such as a pigment-sensitized solar cell.

In the above-described present disclosure, the single layer or multiple layers of graphene formed on a first substrate and the second substrate are bonded together through the adhesive layer including a delayed-curing UV curable resin by a roll-to-roll process. Therefore, the curing can be terminated in a certain period of time after the adhesive layer is irradiated with UV rays. For this reason, the laminated structure can be wound up into a roll before the curing of the adhesive layer terminates, in other words, in a state where flexibility remains in the adhesive layer. Also, the first substrate can be removed from the laminated structure in a state where flexibility remains in the adhesive layer.

Advantageous Effects of Invention

According to the present disclosure, a laminated structure such as a transparent conductive film including graphene can be manufactured by a roll-to-roll process with high throughput, while peeling of the layers constituting the laminated structure can be inhibited. Furthermore, this excellent laminated structure can be used as a transparent conductive film and the like to achieve various electronic devices such as a high performance display or touch panel.

Additional features and advantages are described herein, and will be apparent from the following Detailed Description and the figures.

DETAILED DESCRIPTION

Hereinafter, a mode for carrying out the invention (hereinafter, referred to as an "embodiment") will be described. It is noted that the description will be made in the order below.
1. First embodiment (Laminated structure and manufacturing method thereof)
2. Second embodiment (Laminated structure and manufacturing method thereof)

3. Third embodiment (Laminated structure and manufacturing method thereof)
4. Fourth embodiment (Laminated structure and manufacturing method thereof)
5. Fifth embodiment (Laminated structure and manufacturing method thereof)
6. Sixth embodiment (Laminated structure and manufacturing method thereof)
7. Seventh embodiment (Transparent conducting film and manufacturing method thereof)
8. Eighth embodiment (Display and manufacturing method thereof)

1. First Embodiment

Laminated Structure and Manufacturing Method Thereof

FIG. 1 to FIG. 5 illustrate a laminated structure and a manufacturing method thereof according to the first embodiment.

Figure 1:
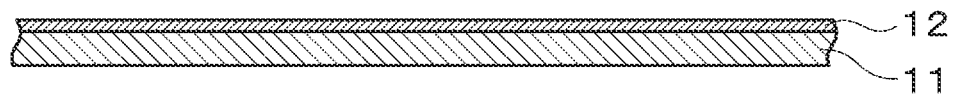
FIG. 1 is a cross-sectional diagram for explaining a laminated structure and a manufacturing method thereof according to the first embodiment.

As illustrated in FIG. 1, a flexible tape-like film is prepared in which a single layer or multiple layers of graphene 12 are formed on a first substrate 11. The first substrate 11 to be used is, but not limited to, a substrate at least having a surface on which a metal catalyst such as copper and nickel is formed, and typically a metal foil such as a copper foil. Although a synthesis method of the graphene 12 is not particularly limited, a thermal CVD method is preferably used.

Figure 2:
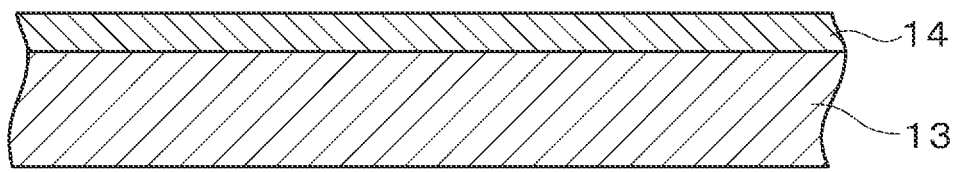
FIG. 2 is a cross-sectional diagram for explaining a laminated structure and a manufacturing method thereof according to the first embodiment.

On the other hand, as illustrated in FIG. 2, a flexible tape-like film is prepared in which a second substrate 13 is coated with an adhesive layer 14 including a delayed-curing UV curable resin. Here, examples of the delayed-curing UV curable resin to be used include a cationic polymerization-type UV curable resin, a radical polymerization-type UV curable resin containing at least one of a thermosetting resin and a cationic polymerization-type UV curable resin, and a semi-curing radical polymerization-type UV curable resin. This delayed-curing UV curable resin is, for example, a resin in which a time taken to the termination of curing, that is, to the curing of not less than 80%, after the irradiation with UV rays is not less than 10 seconds, not less than 30 seconds, not less than 1 minute, or not less than 10 minutes, and is usually within one week. Also, the volatile matter contained in the delayed-curing UV curable resin is preferably less than 1% by weight, more preferably not more than 0.5% by weight, and further preferably not more than 0.1% by weight, and has adhesiveness. The thickness of this adhesive layer 14 is selected to be preferably, for example, not more than 30 μm, and more preferably not more than 20 μm, in order to allow the surface of this adhesive layer 14 to become flat. Also, the thickness of this adhesive layer 14 is selected to be preferably, for example, not less than 1 μm, and more preferably not less than 2 μm, in order to obtain sufficient adhesion. The adhesive layer 14 has an adhesive power of preferably, for example, not less than 2 N/m at room temperature, but not limited thereto. The second substrate 13 is not particularly limited as long as it is flexible, and may be a transparent substrate or an opaque substrate. As the flexible transparent substrate, a transparent plastic substrate is used. Examples of the transparent plastics may include polyethylene terephthalate, polyethylene naphthalate, polycarbonate, polystyrene, polyethylene, polypropylene, polyphenylene sulfide, polyvinylidene fluoride, acetyl cellulose, phenoxy bromide, aramids, polyimides, polystyrenes, polyarylates, polysulfones, and polyolefins. Depending on the type of the adhesive layer 14, the surface of the second substrate 13 may be subjected to hydrophilic treatment or silane coupling treatment, prior to coating the second substrate 13 with the adhesive layer 14.

Figure 3:
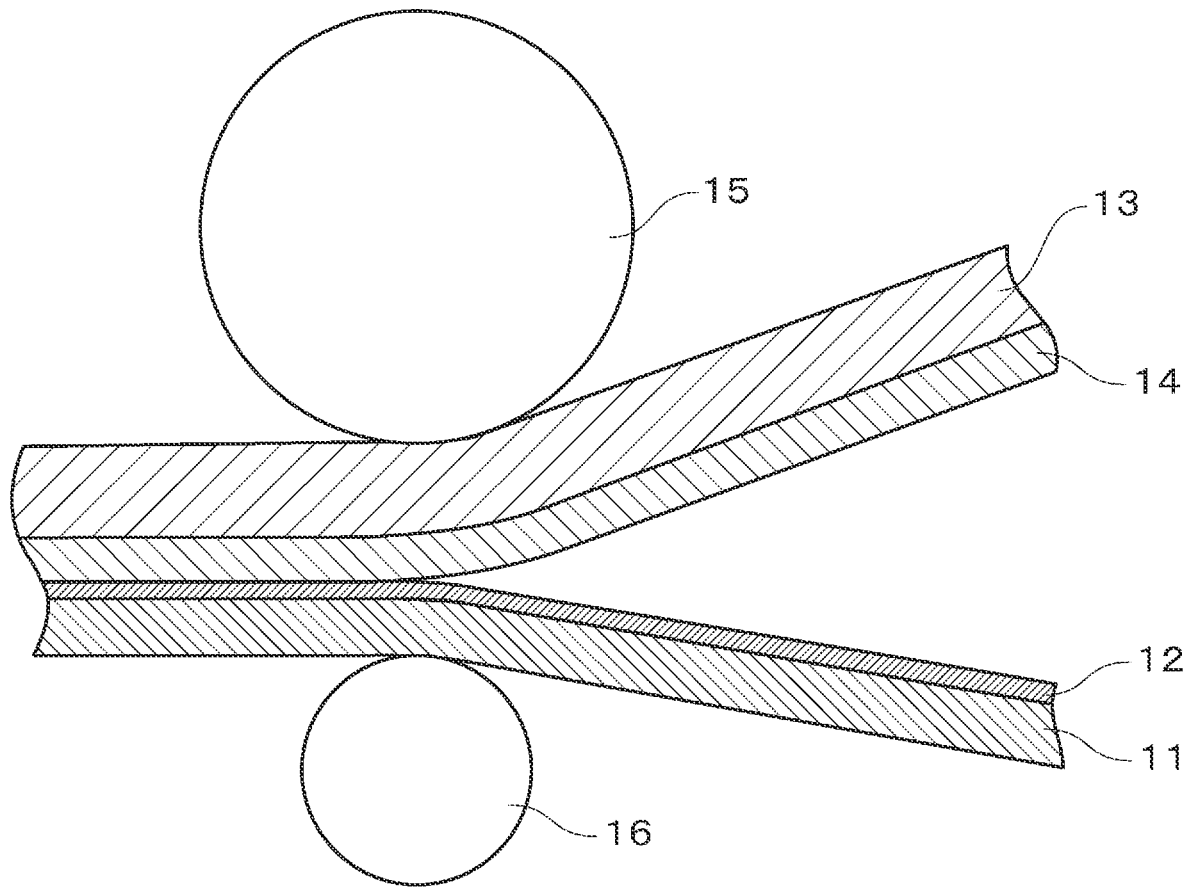
FIG. 3 is a cross-sectional diagram for explaining a laminated structure and a manufacturing method thereof according to the first embodiment.

Next, as illustrated in FIG. 3, the graphene 12 that is a tape-like film illustrated in FIG. 1 in which the graphene 12 is formed on the first substrate 11, and the adhesive layer 14 that is a tape-like film illustrated in FIG. 2 in which the second substrate 13 is coated with the adhesive layer 14 are bonded together by a roll-to-roll process. Reference numerals 15 and 16 indicate rollers.

Figure 4:
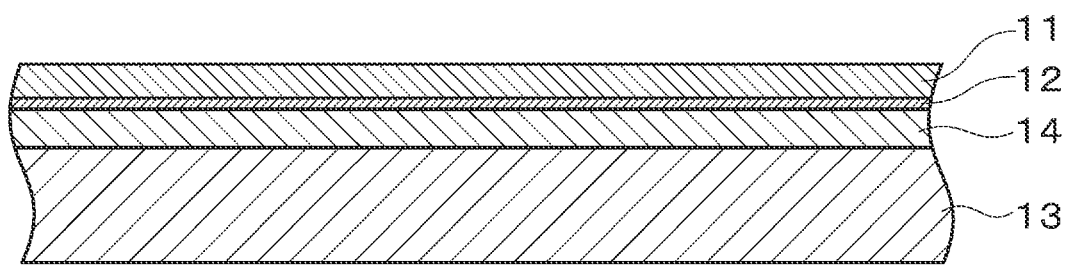
FIG. 4 is a cross-sectional diagram for explaining a laminated structure and a manufacturing method thereof according to the first embodiment.

FIG. 4 illustrates a laminated structure manufactured through the bonding by a roll-to-roll process in this manner.

Figure 5:
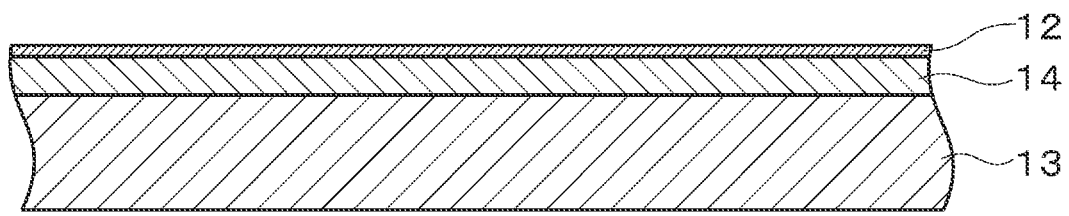
FIG. 5 is a cross-sectional diagram for explaining a laminated structure and a manufacturing method thereof according to the first embodiment.

Thereafter, as necessary, as illustrated in FIG. 5, the first substrate 11 is removed. For removing the first substrate 11, etching is preferably used. The etching method is not particularly limited, as long as it can remove the metal catalyst constituting the first substrate 11. Although either dry etching using a vacuum apparatus or wet etching using an etchant (an etching liquid) may be used as the etching method, the wet etching is preferably used from the viewpoint of etching efficiency. The wet etching can be performed by spraying the first substrate 11 with an etchant, or by dipping the first substrate 11 in an etchant put in an etching tank. The etchant to be used in the wet etching is not particularly limited, as long as the metal catalyst can be dissolved in the etchant. When the metal catalyst includes copper, for example, when the first substrate 11 includes copper, the etchant to be used may be preferably a mixture of hydrochloric acid with iron chloride or copper chloride. However, there can also be used the etchant that is an acid such as phosphoric acid and nitric acid, or that is redox such as iron nitrate and iron chloride. When the redox etchant is used, air bubbles are not generated during etching. Accordingly, the occurrence of defects to the graphene 12 can be suppressed, while the metal catalyst can be uniformly dissolved. When the wet etching is performed by dipping the first substrate 11 in an etchant put in an etching tank, the etchant is preferably stirred during etching in order to increase the etching rate. Regarding the etching, electrolytic etching in an aqueous solution of copper sulfate may be used.

Thereafter, the surface of the graphene 12 exposed by the removal of the first substrate 11 is washed with pure water or the like, and dried.

Next, a specific example of the manufacturing method of a laminated structure according to the first embodiment will be described.

Figure 6:
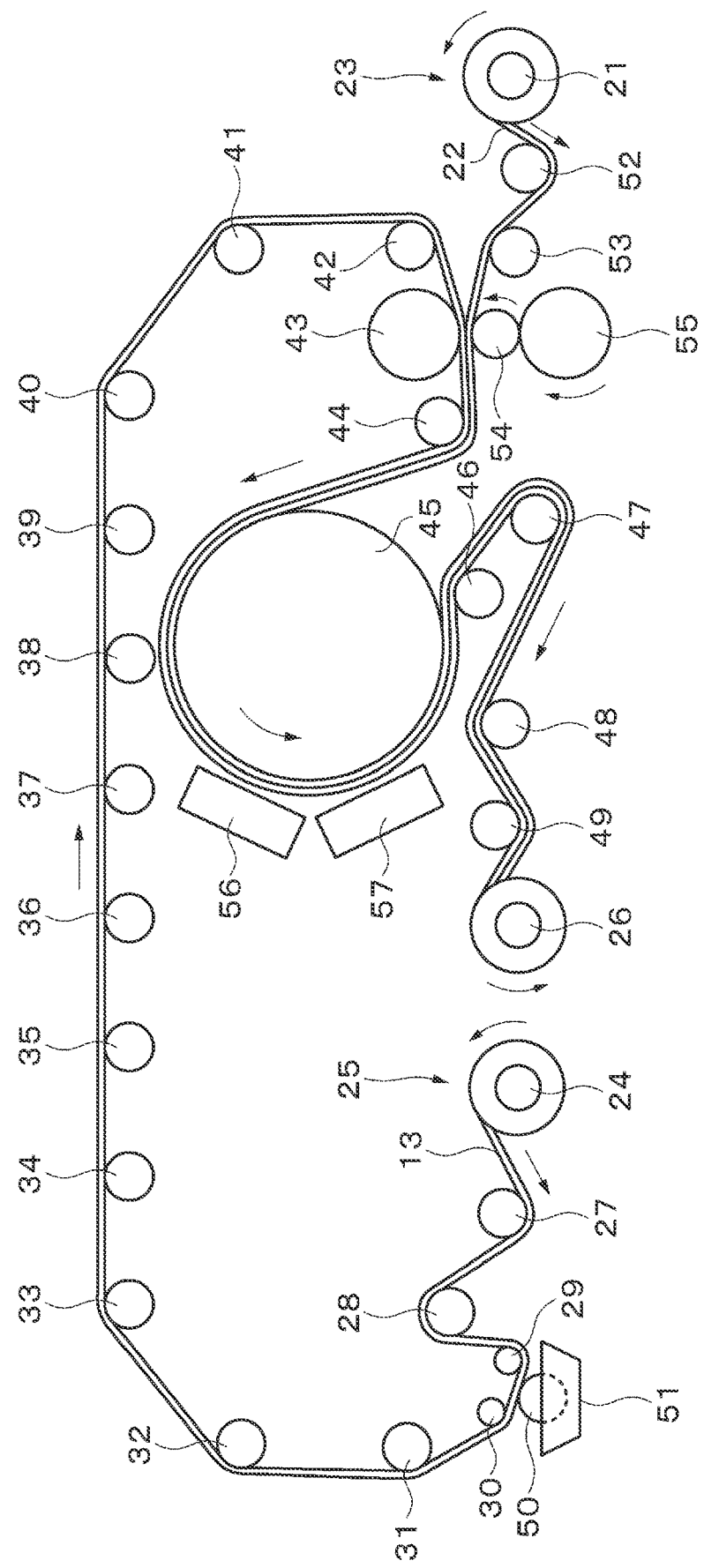
FIG. 6 is a schematic diagram for explaining a specific example of the manufacturing method of a laminated structure according to the first embodiment.

FIG. 6 illustrates one example of the manufacturing apparatus used for manufacturing the laminated structure illustrated in FIG. 4 by a roll-to-roll process.

As illustrated in FIG. 6, this manufacturing apparatus includes a roll 23 having a core 21 around which a flexible tape-like graphene-added substrate 22 is wound, a roll 25 having a core 24 around which the flexible tape-like second substrate 13 is wound, and a core 26 for winding up a laminated structure. The graphene-added substrate 22 includes, as illustrated in FIG. 1, the single layer or multiple layers of graphene 12 formed on the first substrate 11.

The second substrate 13 is fed from the core 24 through rollers 27 to 49, and the laminated structure is wound up by the core 26 for winding-up. Below the second substrate 13 between the roller 29 and the roller 30, a roller 50 is disposed. The lower surface of this roller 50 is dipped in an adhesive (not shown) including a delayed-curing UV curable resin put in a container 51. The lower surface of the second substrate 13 is coated with the adhesive attached to the surface of the roller 50. In this manner, the second substrate 13 passes the roller 50 thereby to form the adhesive layer 14. On the other hand, the graphene-added substrate 22 is fed from the roll 23 through rollers 52 to 54. The roller 54 is rotated by a roller 55. The second substrate 13 that includes the adhesive layer 14 formed thereon and has passed the roller 42, and the graphene-added substrate 22 that has passed the roller 53 pass through between the roller 43 and the roller 54, thereby to be bonded to each other. Thus, the laminated structure is formed. While the laminated structure formed in this manner passes around the surface of the roller 45 having a large diameter, the adhesive layer 14 including the delayed-curing UV curable resin is irradiated with UV rays from UV irradiation apparatuses 56 and 57 equipped with UV lamps. The laminated structure irradiated with UV rays in this manner passes the rollers 46 to 49, and is wound up by the core 26. At this time, the curing of the adhesive layer 14 of the laminated structure irradiated with UV rays is not terminated at least until the laminated structure is totally wound up by the core 26.

As described above, according to this first embodiment, a flexible tape-like film including the single layer or multiple layers of graphene 12 formed on the first substrate 11, and a flexible tape-like film including the adhesive layer 14 containing the delayed-curing UV curable resin applied on the second substrate 13 are bonded to each other by a roll-to-roll process, thereby to form the laminated structure. For this reason, winding-up can be completed before the curing of the adhesive layer 14 terminates after the irradiation of the adhesive layer 14 with UV rays. Accordingly, the peeling of the layers constituting the laminated structure can be inhibited. Also, depending on the selection of the delayed-curing UV curable resin constituting the adhesive layer 14, the first substrate 11 can be removed before the curing of the adhesive layer 14 terminates after the irradiation of the adhesive layer 14 with UV rays. Furthermore, since the graphene 12 and the second substrate 13 are bonded to each other with the adhesive layer 14, intimate contact properties of the graphene 12 to the second substrate 13 is favorable. Also, the volatile matter contained in the adhesive layer 14 when bonding the graphene 12 and the second substrate 13 is a very small amount at less than 1% by weight, so that the volatile matter hardly volatilizes from the adhesive layer 14 in the process after bonding the graphene 12 and the second substrate 13, causing air bubbles to be hardly generated. For this reason, air bubbles can hardly cause defects to occur in the graphene 12. Also, since the amount of the volatile matter contained in the adhesive layer 14 is as very small as less than 1% by weight, coating with the adhesive layer 14 even over a large area can suppress air bubbles to be generated by the volatile matter. For this reason, the area of the graphene 12 can be increased. Also, when removing the first substrate 11 by etching, the graphene 12 is tightly retained by the second substrate 13 through the adhesive layer 14. Therefore, the occurrence of defects to the graphene 12 can be effectively suppressed. Especially, when spraying the first substrate 11 with an etchant thereby to remove the first substrate 11 by etching, the occurrence of defects to the graphene 12 can be more effectively suppressed. Also, in the transfer method known to the inventors, a resin layer sometimes exists on the graphene formed on the substrate. However, according to this first embodiment, the adhesive layer 14 exists between the graphene 12 and the second substrate 13, and does not exist on the graphene 12. Therefore, unlike the transfer method known to the inventors, the process of removing the resin layer is not required, thus enabling the throughput of the transfer to be improved.

Also, by using a transparent substrate as the second substrate 13, there can be obtained a transparent conductive film including the laminated structure in which the graphene 12 and the second substrate 13 are bonded to each other with the adhesive layer 14. This excellent transparent conductive film is preferably used in, for example, a display, a touch panel, and a pigment-sensitized solar cell.

2. Second Embodiment

Laminated Structure and Manufacturing Method Thereof

Figure 7:
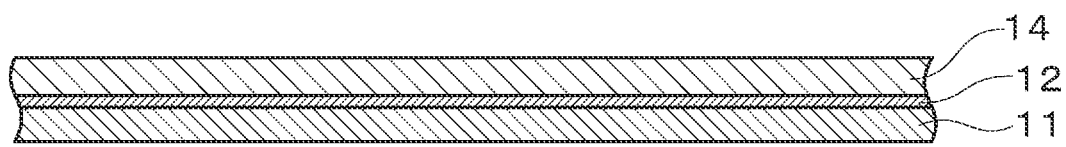
FIG. 7 is a cross-sectional diagram for explaining a laminated structure and a manufacturing method thereof according to the second embodiment.
Figure 8:
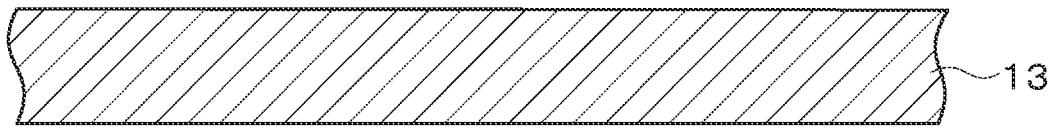
FIG. 8 is a cross-sectional diagram for explaining a laminated structure and a manufacturing method thereof according to the second embodiment.
Figure 9:
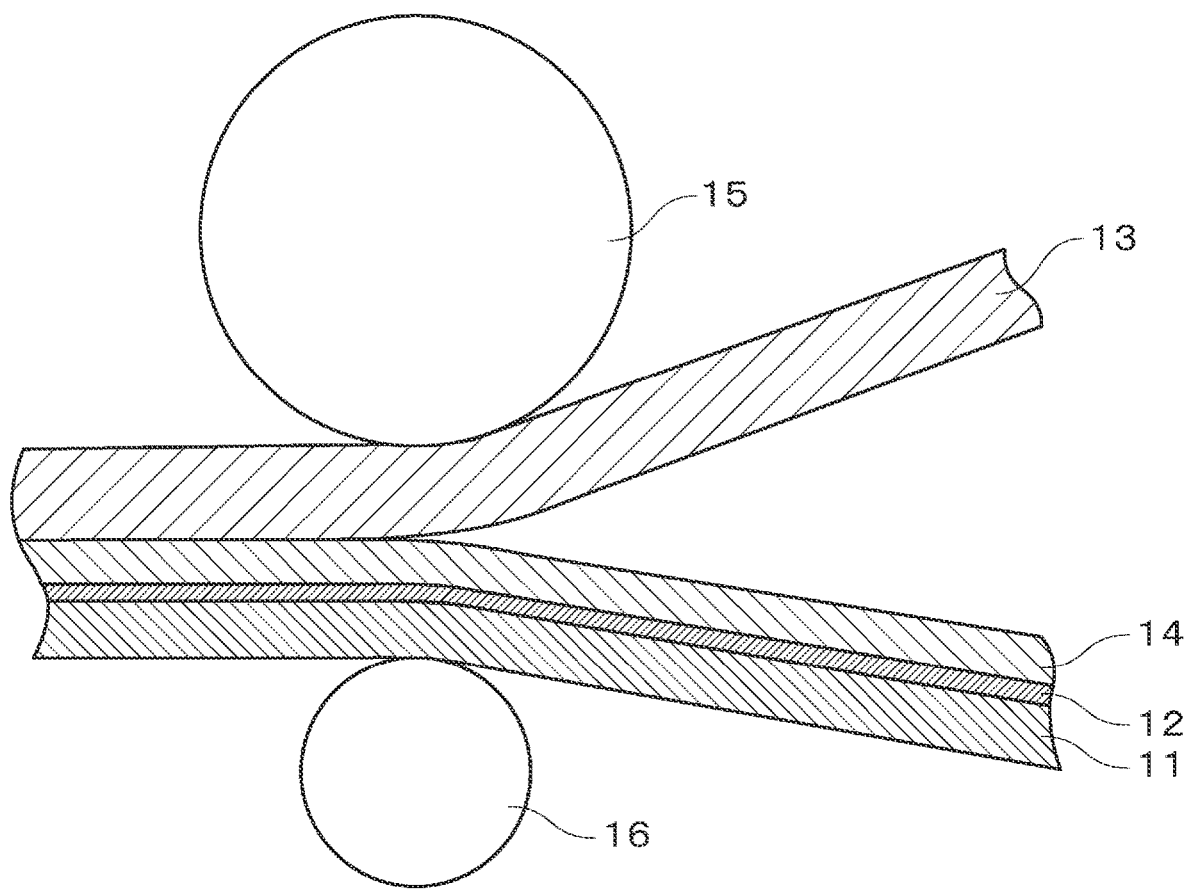
FIG. 9 is a cross-sectional diagram for explaining a laminated structure and a manufacturing method thereof according to the second embodiment.

FIG. 7 to FIG. 9 illustrate a laminated structure and a manufacturing method thereof according to the second embodiment.

In this second embodiment, as illustrated in FIG. 7, the graphene 12 formed on the first substrate 11 is coated with the adhesive layer 14. Then, this adhesive layer 14 applied on the graphene 12 is used in place of the graphene 12 formed on the first substrate 11 in the first embodiment, while the second substrate 13 itself illustrated in FIG. 8 is used in place of the adhesive layer 14 applied on the second substrate 13 in the first embodiment. These are bonded together as illustrated in FIG. 9 to form the laminated structure.

Otherwise, this second embodiment is similar to the first embodiment.

According to this second embodiment, various advantages similar to those in the first embodiment can be obtained.

3. Third Embodiment

Laminated Structure and Manufacturing Method Thereof

In the third embodiment, similarly to the first embodiment, the second substrate 13 or the graphene 12 formed on the first substrate 11 is coated with the adhesive layer 14 that contains at least not less than 1% by weight of the volatile matter and has adhesiveness. The material properties, thickness and the like of this adhesive layer 14 are similar to those in the first embodiment.

Next, the adhesive layer 14 is dried to allow the volatile matter to volatilize so that the volatile matter becomes less than 1% by weight, preferably not more than 0.5% by weight, and more preferably not more than 0.1% by weight. This drying reduces the thickness of the adhesive layer 14. The adhesive layer 14 to be used has adhesiveness after the drying, and also has autogenous deformation properties.

Next, similarly to the first embodiment, the graphene 12 formed on the first substrate 11 and the adhesive layer 14 formed on the second substrate 13 are bonded to each other, or the adhesive layer 14 formed on the graphene 12 formed on the first substrate 11 and the second substrate 13 are bonded to each other. Thus, the laminated structure is formed.

Thereafter, the processes proceed in a similar manner to the first embodiment.

According to the above, the laminated structure in which the graphene 12 and the second substrate 13 are bonded to each other with the adhesive layer 14 can be obtained.

According to this third embodiment, various advantages similar to those in the first embodiment can be obtained.

4. Fourth Embodiment

Laminated Structure and Manufacturing Method Thereof

In the fourth embodiment, a method that enables the problem incurred when large roughness exists on the surface of the graphene 12 to be solved will be described.

Figure 10:
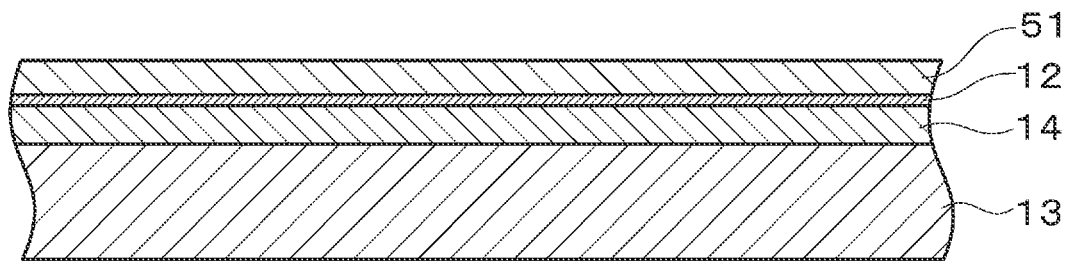
FIG. 10 is a cross-sectional diagram for explaining a laminated structure and a manufacturing method thereof according to the fourth embodiment.

In this fourth embodiment, as illustrated in FIG. 10, a transparent layer 51 is formed on the graphene 12 of the laminated structure. A forming method of the transparent layer 51 is not particularly limited, as long as the unevenness on the surface of the graphene 12 can be filled. For example, the transparent layer 51 is applied and formed on the graphene 12 by a roll-to-roll process. When a substance similar to the adhesive layer 14 is used as the transparent layer 51, a method similar to the method used for forming the adhesive layer 14 can be employed. Preferably, for example, when it is assumed that the refractive index of the transparent layer 51 is $n_1$, and the refractive index of the adhesive layer 14 is $n_2$, the materials of the transparent layer 51 and the adhesive layer 14 are selected so as to satisfy $|n_1-n_2|\leq 0.2$, and more preferably $|n_1-n_2|\leq 0.05$. It is noted that when the laminated structure is used in a device, in consideration of leading out the wiring from the graphene 12, a joint portion of the graphene 12 with the wiring may be configured not to be covered by the transparent layer 51 as necessary.

According to the above, there can be obtained the laminated structure in which the graphene 12 and the second substrate 13 are bonded to each other with the adhesive layer 14, and the transparent layer 51 is formed on the graphene 12. As necessary, a protective layer may be formed on the transparent layer 51. The protective layer to be used preferably has a refractive index approximately identical to that of the transparent layer 51. Specific examples of the protective layer may include a glass plate and a polyethylene terephthalate (PET) film.

Figure 11:
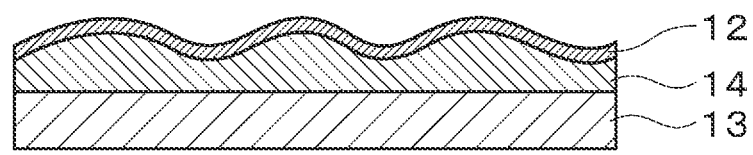
FIG. 11 is a cross-sectional diagram illustrating unevenness formed on a surface of graphene in the laminated structure and the manufacturing method thereof according to the fourth embodiment.
Figure 12:
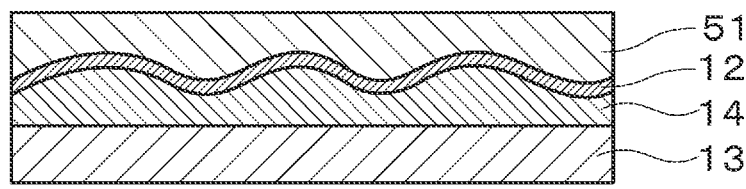
FIG. 12 is a cross-sectional diagram illustrating that the unevenness formed on a surface of graphene is filled with a transparent layer in the laminated structure and the manufacturing method thereof according to the fourth embodiment.

FIG. 11 illustrates that unevenness exists on the surface of the graphene 12, and FIG. 12 illustrates that the unevenness on the surface of the graphene 12 is filled with the transparent layer 51 after the transparent layer 51 is formed on the graphene 12.

According to this fourth embodiment, the following advantages can be obtained, in addition to the advantages similar to those in the first embodiment. That is, since the transparent layer 51 is formed on the graphene 12, the unevenness formed on the surface thereof when forming the graphene 12 can be filled with the transparent layer 51. For this reason, a transparent conductive film having an extraordinarily small haze value can be obtained. For example, in the case where the haze value when the transparent layer 51 is not formed is about 10%, the haze value when the transparent layer 51 is formed can be considerably reduced to be about 3%. Also, since the graphene 12 is protected by the transparent layer 51, the life of the transparent conductive film can be improved. This excellent transparent conductive film is preferably used in, for example, a display, a touch panel, and a pigment-sensitized solar cell.

5. Fifth Embodiment

Laminated Structure and Manufacturing Method Thereof

Figure 13:
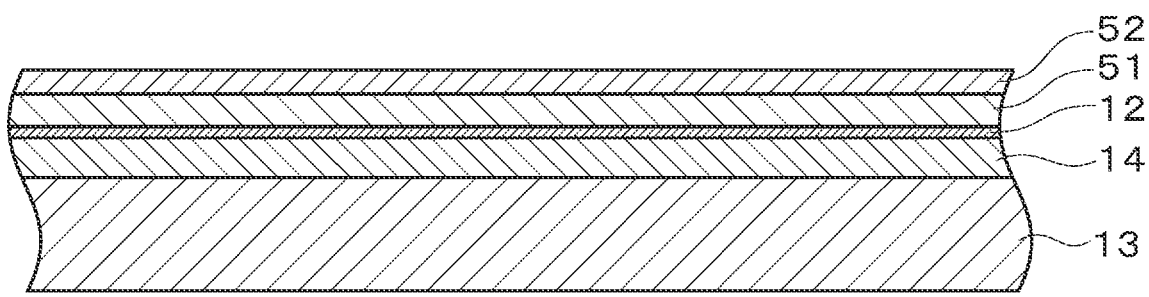
FIG. 13 is a cross-sectional diagram for explaining a laminated structure and a manufacturing method thereof according to the fifth embodiment.

As illustrated in FIG. 13, in the fifth embodiment, a functional layer 52 including at least one selected from the group consisting of a reflection preventing layer, an anti-glare layer, a hard coat layer and an antifouling layer is formed on the transparent layer 51.

By using the reflection preventing layer as the functional layer 52, the reflection of light entering the laminated structure can be inhibited. By using the anti-glare layer as the functional layer 52, the glare due to light entering the laminated structure can be inhibited. By using the hard coat layer as the functional layer 52, the surface of the laminated structure can be protected. By using the antifouling layer as the functional layer 52, for example, a fingerprint can be inhibited from being left on the surface of the laminated structure. The reflection preventing layer, anti-glare layer, hard coat layer and antifouling layer to be used may be known to the inventors, and selected as necessary. Also, the thickness of each of the reflection preventing layer, anti-glare layer, hard coat layer and antifouling layer is selected as necessary.

Otherwise, this fifth embodiment is similar to the first to fourth embodiments.

According to this fifth embodiment, in addition to various advantages similar to those in the first embodiment, there can be obtained advantages that the laminated structure containing the graphene 12 can be obtained which has an extraordinarily low haze value and high transmittance, and is suitable for using as a transparent conductive film of a touch panel.

6. Sixth Embodiment

Laminated Structure and Manufacturing Method Thereof

In the sixth embodiment, after the structure is formed in which the graphene 12 is formed on the second substrate 13 through the adhesive layer 14, and before the transparent layer 51 is formed, at least one process of the processes such as patterning of the graphene 12, doping to the graphene 12 with various dopants, formation of wiring (an extraction electrode), and formation of other structures is performed, depending on the application and function of the laminated structure.

Specifically, for example, the graphene 12 is subjected to patterning by a photolithography method using dry etching such as laser etching, oxygen plasma, and UV ozone treatment. Also, gas such as oxygen is adsorbed to the graphene 12, or a dopant such as a solution of sulfuric acid, nitric acid or gold chloride is applied on the graphene 12, thereby to dope the graphene 12. Also, wiring is formed on the graphene 12 using a printing method or a photolithography method.

Otherwise, this sixth embodiment is similar to the first to fourth embodiments. It is noted that in the sixth embodiment, when joint wiring is formed in the graphene 12 before the transparent layer 51 is formed, a portion of the wiring is further connected with an external circuit. Therefore, as necessary, the portion may not be covered by the transparent layer 51.

According to this sixth embodiment, various advantages similar to those in the first embodiment can be obtained.

7. Seventh Embodiment

Transparent Conducting Film and Manufacturing Method Thereof

Figure 14:
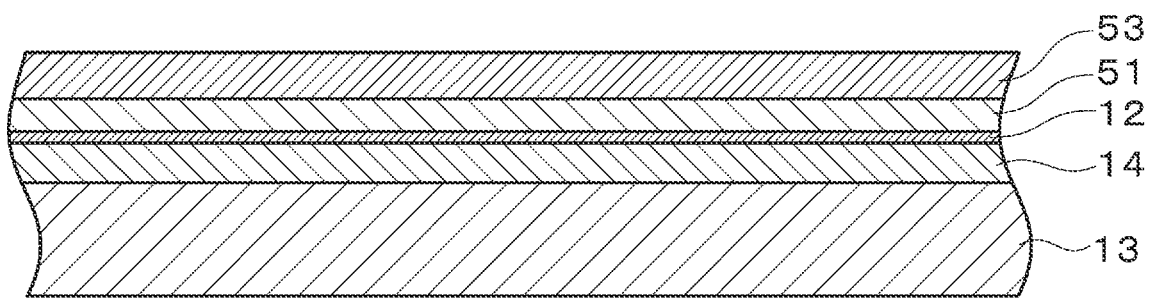
FIG. 14 is a cross-sectional diagram for explaining a transparent conducting film and a manufacturing method thereof according to the seventh embodiment.

As illustrated in FIG. 14, in the seventh embodiment, the transparent layer 51 side of the laminated structure is bonded to a transparent film 53. The material and thickness of the film 17 are selected as necessary.

According to this seventh embodiment, there can be obtained a transparent conducting film including the laminated structure containing the graphene 12 in which the haze value is extraordinarily small and the transmittance is also high.

8. Eighth Embodiment

Display and Manufacturing Method Thereof

Figure 15:
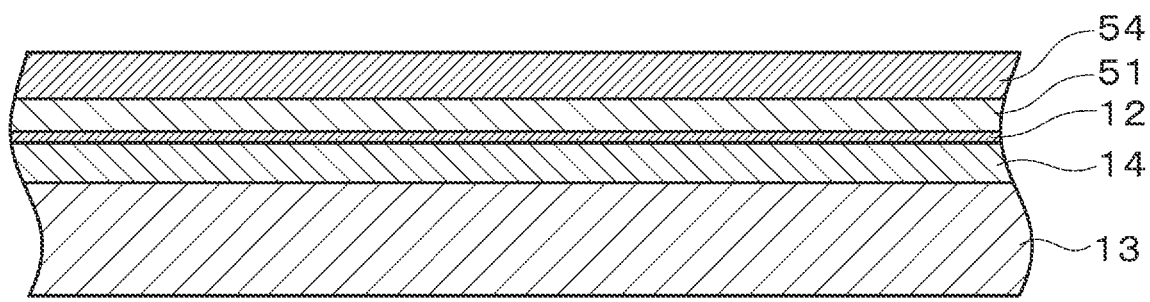
FIG. 15 is a cross-sectional diagram for explaining a display and a manufacturing method thereof according to the eighth embodiment.

As illustrated in FIG. 15, in the eighth embodiment, the transparent layer 51 side of the laminated structure is bonded to a screen of a display 54. The display 54 is, but not limited to, a liquid crystal display and an organic EL display.

According to this eighth embodiment, there can be obtained a display in which the transparent conductive film that includes the laminated structure containing the graphene 12 and has an extraordinarily small haze value and also high transmittance is bonded to a screen.

<Example>(Example Corresponding to the First Embodiment)

As the first substrate 11 and the graphene 12, a tape-like graphene-added copper foil having a thickness of 36 μm and a width of 230 mm was used. As the second substrate 13, a PET film (manufactured by Teijin Limited, KEL86W) having a thickness 125 μm and a width of 230 mm was used. This PET film was coated with an adhesive layer including a commercially available epoxy-based UV curable resin having a low reaction rate as the adhesive layer 14 including a delayed-curing UV curable resin. Then, the graphene-added copper foil and the adhesive layer applied on the PET film were bonded to each other by a roll-to-roll process, thereby to form a laminated structure. The bonding rate (tape feeding rate) was approximately 4 m/minute. The UV irradiation to the adhesive layer was performed at an integrated light quantity of approximately 1000 mJ/cm$^2$.

Here, the results of the adhesiveness evaluation of this adhesive layer will be described. After spin-coating the PET film with the adhesive including the epoxy-based UV curable resin having a low reaction rate under the condition of 4000 rpm and 40 seconds, UV rays were emitted for a prescribed time (output at approximately 100 mW/cm$^2$). Thereafter, the adhesiveness was evaluated while allowed to stand. As a result, the adhesiveness with respect to the standing time and the UV irradiation amount was as below.

Standing time UV irradiation amount (mJ/cm$^2$)
  5 seconds Presence of adhesiveness at 1000 to 3500 (including presence of tackiness)
    Cured, and absence of adhesiveness at 4000 (or curing of more than 80%)
  10 seconds Presence of adhesiveness at 1000 to 3000 (including presence of tackiness)
    Cured, and absence of adhesiveness at 3500 (or curing of more than 80%)
  20 seconds Presence of adhesiveness at 1000 to 3000 (including presence of tackiness)
  30 seconds Presence of adhesiveness at 1000 to 2000 (including presence of tackiness)
    Cured, and absence of adhesiveness at 3000 (or curing of more than 80%)
  60 seconds Presence of adhesiveness at 1000 to 2000 (including presence of tackiness)
  2 minutes Presence of adhesiveness at 1000 to 2000 (including presence of tackiness)
  5 minutes Presence of adhesiveness at 1000 (including presence of tackiness)
    Cured, and absence of adhesiveness at 2000 (or curing of more than 80%)
  10 minutes Presence of adhesiveness at 1000 (including presence of tackiness)
  30 minutes Presence of adhesiveness at 50 to 100 (including presence of tackiness)
    Cured, and absence of adhesiveness at 200 (or curing of more than 80%)
  1 hour Presence of adhesiveness at 50 (including presence of tackiness)
    Cured, and absence of adhesiveness at 100 (or curing of more than 80%)
  4 hours Presence of adhesiveness at 50 (including presence of tackiness)
  6 hours Presence of adhesiveness at 50 (including presence of tackiness)

Comparative Example

A laminated structure was formed in a similar manner to the example, except that a common UV curable resin (manufactured by Sony Chemical & Information Device Corporation, SK1120) was used as the adhesive layer 14.

In the example, since adhesiveness remained in the adhesive layer from the UV exposure to the winding, bonding was enabled without peeling. On the contrary, in the comparative example, after the UV exposure was performed, the both peeled from each other before the winding-up was completed, thereby disabling the bonding.

Although the embodiments and the examples have been specifically described, the present technology is not restricted to the above embodiments and examples, and various modifications can be made.

For example, the numeral values, structures, processes, shapes, materials and the like described in the above-described embodiments and examples are only exemplary, and the numeral values, structures, processes, shapes, materials and the like other than these may be used as necessary.

Additionally, the present technology may also be configured as below.

(1) A manufacturing method of a laminated structure including:
  a step of bonding a single layer or multiple layers of graphene formed on a first substrate to a second substrate through an adhesive layer including a delayed-curing UV curable resin by a roll-to-roll process.

(2) The manufacturing method of a laminated structure according to (1),
  wherein the graphene formed on the first substrate is bonded to the adhesive layer formed on the second substrate, or the adhesive layer formed on the graphene formed on the first substrate is bonded to the second substrate.

(3) The manufacturing method of a laminated structure according to (1),
  wherein after a laminated structure is formed by bonding the graphene formed on the first substrate to the adhesive layer formed on the second substrate, or bonding the adhesive layer formed on the graphene formed on the first substrate to the second substrate, the adhesive layer is irradiated with UV rays.

(4) The manufacturing method of a laminated structure according to any one of (1) to (3), wherein the delayed-curing UV curable resin contains at least one of (A), (B), and (C) below:

(A) a cationic polymerization-type UV curable resin (B) a radical polymerization-type UV curable resin containing at least one of a thermosetting resin and a cationic polymerization-type UV curable resin (C) a semi-curing radical polymerization-type UV curable resin, the manufacturing method of a laminated structure according to any one of (1) to (3).

(5) The manufacturing method of a laminated structure according to any one of (1) to (4), wherein after the laminated structure is formed by bonding the graphene formed on the first substrate to the adhesive layer formed on the second substrate, or bonding the adhesive layer formed on the graphene formed on the first substrate to the second substrate, curing of the adhesive layer is not terminated from irradiation of the adhesive layer with UV rays until at least the laminated structure is wound up around a roll.

(6) The manufacturing method of a laminated structure according to any one of (1) to (4), wherein after the laminated structure is formed by bonding the graphene formed on the first substrate to the adhesive layer formed on the second substrate, or bonding the adhesive layer formed on the graphene formed on the first substrate to the second substrate, curing of the adhesive layer is not terminated from irradiation of the adhesive layer with UV rays until at least the first substrate is removed from the laminated structure.

(7) The manufacturing method of a laminated structure according to any one of (1) to (6), wherein the adhesive layer has a time from irradiation of the adhesive layer with UV rays to termination of curing of the adhesive layer of not less than 10 seconds.

(8) The manufacturing method of a laminated structure according to any one of (1) to (7), wherein the first substrate is a metal foil.

(9) The manufacturing method of a laminated structure according to any one of (1) to (8), wherein the second substrate is a transparent substrate.

(10) The manufacturing method of a laminated structure according to any one of (1) to (9), wherein a volatile matter content of the adhesive layer is not more than 0.1% by weight.

(11) The manufacturing method of a laminated structure according to any one of (1) to (10), wherein the adhesive layer has a thickness of not less than 1 μm and not more than 30 μm.

(12) The manufacturing method of a laminated structure according to any one of (1) to (11), wherein the laminated structure is a transparent conductive film.

It is noted that the method of peeling the first substrate after bonding the graphene formed on the first substrate including a metal foil represented by a copper foil to the second substrate such as a transparent substrate by, but not limited to, a roll-to-roll process includes the following method.

Figure 16:
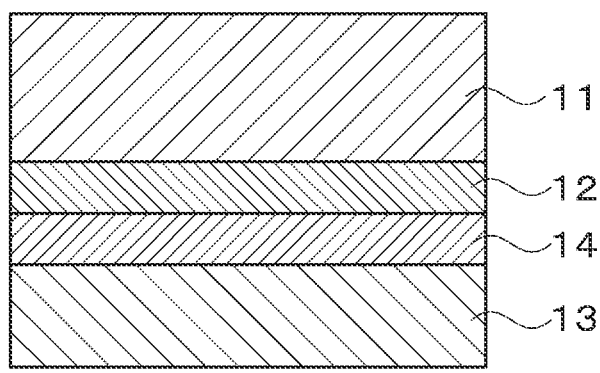
FIG. 16 is a cross-sectional diagram for explaining a method of bonding graphene formed on a first substrate including a metal foil to a second substrate, and then peeling the first substrate.

That is, as illustrated in FIG. 16, the single layer or multiple layers of graphene 12 formed on the first substrate 11 including a metal foil, and the second substrate 13 such as a transparent substrate are preferably bonded to each other through the transparent adhesive layer 14. In this case, the adhesive layer 14 to be used preferably contains an acid functional group. Specific examples of the adhesive layer 14 to be used include an adhesive layer containing an acid functional group such as a carboxyl group, a sulfone group and a phosphate group at a prescribed ratio in a backbone of a polymer (for example, acryl, epoxy, urethane, styrene and oxetane) that becomes a main component; or an adhesive layer containing as a sub-component a polymer that contains a similar acid functional group at a prescribed ratio. It is noted that the adhesive layer 14 that generates an acid during curing or the adhesive layer 14 that contains an oxidizing agent can be used in place of the adhesive layer 14 that contains an acid functional group.

Figure 17:
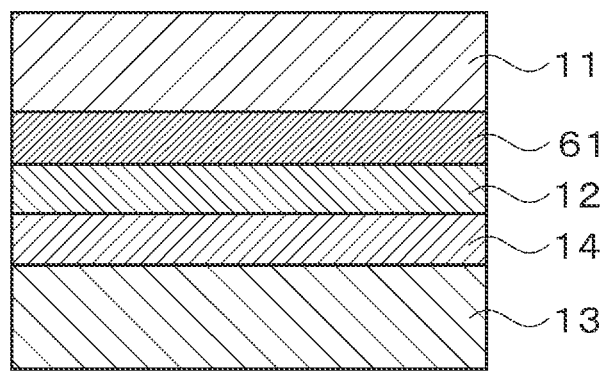
FIG. 17 is a cross-sectional diagram for explaining a method of bonding graphene formed on a first substrate including a metal foil to a second substrate, and then peeling the first substrate.

When the graphene 12 formed on the first substrate 11 and the second substrate 13 are brought into intimate contact with each other through the adhesive layer 14, the existence of an acid functional group in the adhesive layer 14 causes the metal foil surface of the interface between the graphene 12 and the first substrate 11 including a metal foil to be oxidized to become an oxide. Accordingly, an oxidized film 61 is formed as illustrated in FIG. 17. This formation of the oxidized film 61 weakens the originally very strong intimate contact properties between the graphene 12 and the first substrate 11 including a metal foil. On the other hand, the graphene 12 is fixed to the second substrate 13 with the adhesive layer 14. Therefore, even when the metal foil constituting the first substrate 11 is oxidized, the structure does not change. Thus, the graphene 12 is stably retained on a side of the second substrate 13.

Figure 18:
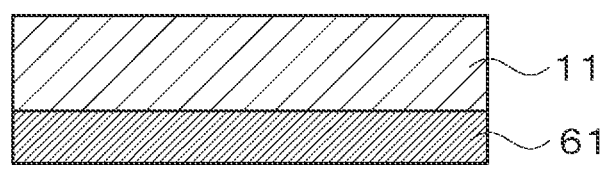
FIG. 18 is a cross-sectional diagram for explaining a method of bonding graphene formed on a first substrate including a metal foil to a second substrate, and then peeling the first substrate.
Figure 18:
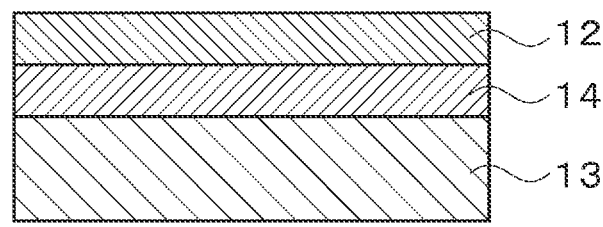

After aging is performed until the outermost surface of the metal foil constituting the first substrate 11 is completely oxidized, the metal foil is physically peeled from the second substrate 13 as illustrated in FIG. 18. Thus, the metal foil can be removed from the second substrate 13. In this manner, a laminated structure containing graphene, for example, a graphene transparent conductive film, can be manufactured.

This method can also be similarly applied to the case of manufacturing a laminated structure containing graphene by a roll-to-roll process.

Example A will be described.

As the first substrate 11 and the graphene 12, a tape-like graphene-added copper foil having a thickness of 36 μm and a width of 230 mm was used. As the second substrate 13, a PET film (manufactured by Teijin Limited, KEL86W) having a thickness of 125 μm and a width of 230 mm was used. After the graphene-added copper foil was coated with an adhesive layer by a spin coating method so as to have a thickness of approximately 5 to 10 μm, the adhesive layer was bonded to the PET film. Thereafter, UV exposure was performed so that the integrated light quantity became not less than 1000 mJ/cm$^2$, thereby to cure the adhesive layer.

After a predetermined time elapsed, the copper foil was peeled from the pet film, and the total light transmittance of the PET film was measured. Accordingly, the graphene attachment amount was evaluated. The adhesive layer used includes an acrylic resin in the presence of or in the absence of a carboxy group, and an epoxy resin in the presence of or in the absence of a phosphate group. The evaluation results are illustrated in Table 3.

TABLE 3

| Resin | Acid functional group | Elapsed time | Total light transmittance | Decrease in transmittance | Estimated graphene coverage |
|---|---|---|---|---|---|
| Acrylic resin | Absence of carboxyl group | Only resin | 91.0% | — | — |
| | | After 12 h | 90.9% | −0.1% | 4.8% (0 to 10%) |
| | Presence of carboxyl group | Only resin | 91.0% | — | — |
| | | After 12 h | 90.2% | −0.9% | 38% (30 to 48%) |
| | | After 3 W | 89.1% | −2.1% | >90% (81 to 100%) |
| Epoxy resin | Absence of phosphate group | Only resin | 91.0% | — | — |
| | | After 12 h | 91.0% | ±0% | 0% (0 to 9%) |
| | | After 3 W | 91.0% | ±0% | 0% (0 to 9%) |
| | Presence of phosphate group | Only resin | 91.0% | — | — |
| | | After 12 h | 90.4% | −0.7% | 29% (19 to 38%) |

As illustrated in Table 3, it is understood that the inclusion of an acid functional group enables graphene to be peeled from a copper foil in both an acrylic resin and an epoxy resin. For example, when an acrylic resin containing a carboxyl group was used, almost all graphene was able to be peeled off after three weeks elapsed. The sheet resistance of the graphene transparent conductive film prepared by peeling off was 1800Ω/□. By performing the carrier doping with a 10 mM gold chloride/nitromethane solution, a sheet resistance of 300Ω/□ was able to be achieved.

According to the above-described method, the following various advantages can be obtained. That is, since a metal foil such as a copper foil is reusable, the raw material cost can be reduced. Also, since etching is not used for removing the metal foil, not only the environmental load can be reduced, but also the damage to graphene can be reduced, thereby to improve the characteristics. Also, simplification of the processes can improve the throughput for the manufacture of a laminated structure such as a transparent conductive film, and can reduce the facility cost. Also, an acid functional group itself can enable stable doping to graphene to be performed.

On the other hand, as the method of bonding the graphene formed on the first substrate including a metal foil represented by a copper foil to the second substrate such as a transparent substrate by, but not limited to, a roll-to-roll process and also performing doping to graphene, the following method is included.

That is, as illustrated in FIG. 16, the single layer or multiple layers of graphene 12 formed on the first substrate 11 and the second substrate 13 such as a transparent substrate are preferably bonded to each other through the transparent adhesive layer (or intimate contact layer) 14. This adhesive layer 14 also functions as a doping layer. In this case, as the adhesive layer 14, a resin containing an acid functional group or a resin generating an acid during curing is used. For example, as the adhesive layer 14, a resin containing an acid in a functional group, an epoxy-based UV curable resin, a resin including a curing agent that is a strong acid, and a resin containing an acid or an oxidizing agent is used. Here, the resin containing an acid in a functional group is, for example, a resin containing an acidic ($pK_a$ is smaller than that of water) functional group such as carboxylic acid, phosphoric acid and sulfonic acid, and having a main backbone that is not particularly limited. The main backbone may be any such as acryl, urethane, epoxy and styrene. The epoxy-based UV curable resin generates an acid during curing thereby to be cured, and therefore may have any backbone. In this case, an initiator is a strong acid. An example of the resin including a curing agent that is a strong acid is a resin including an antimony-based or phosphorus-based curing agent. This corresponds to an epoxy-based resin. An example of the resin containing an acid or an oxidizing agent is a resin mixed with an oxidizing agent such as gold chloride or trifluoromethane sulfonic acid (TFSA). However, since the oxidizing agent can damage a main backbone of the resin, the amount and strength need to be appropriately adjusted. Furthermore, when the acid or the oxidizing agent mixed is colored, the transparency can be damaged. Therefore, the amount and transparency are also appropriately selected.

When the graphene 12 formed on the first substrate 11 and the second substrate 13 are bonded to each other through the adhesive layer 14 as described above, the acid functional group, the acid and the like contained in the adhesive layer 14 cause the graphene 12 being in contact with the adhesive layer 14 to be subjected to doping. In this manner, with the adhesive layer 14, the bonding of the graphene 12 and the second substrate 13 and the doping to the graphene 12 can be achieved. The doping to the graphene 12 may be used in combination with the doping method known to the inventors.

When the adhesive layer 14 contains the acid functional group, the acid or the oxidizing agent, the above-described doping effect can be obtained. However, when used in a device, an extremely large amount of the acid can have an adverse effect such as a negative action on other components (for example, an electrode). For this reason, the strength and amount of the acid to be used have an appropriate range depending on the device. For example, when forming an electrode on a transparent conductive film such as a touch panel, the acidity needs to be a degree that inhibits silver wiring or copper wiring from corroding. In such a case, since the use of sulfonic acid as the acid functional group tends to cause the acidity to become extremely strong, phosphoric acid or carboxylic acid is preferably used.

Figure 19:
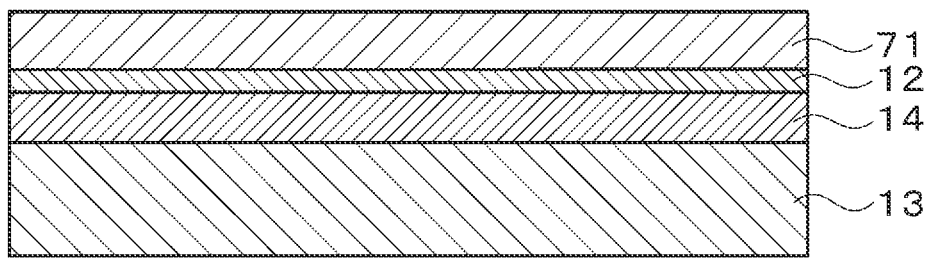
FIG. 19 is a cross-sectional diagram for explaining a method of bonding graphene formed on the first substrate to the second substrate, while performing doping of the graphene.
Figure 20:
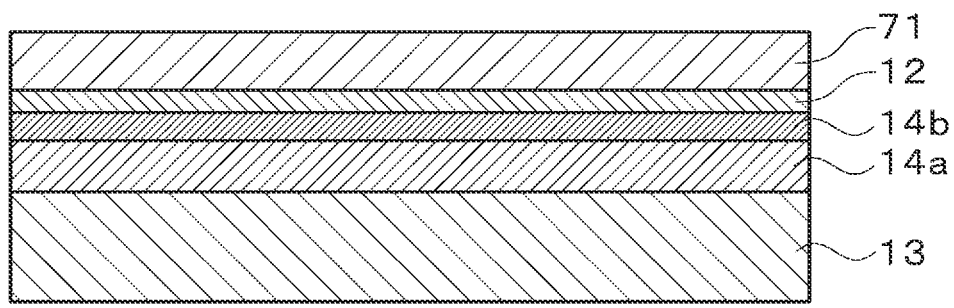
FIG. 20 is a cross-sectional diagram for explaining a method of bonding graphene formed on the first substrate to the second substrate, while performing doping of the graphene.

The laminated structure containing graphene may be, for example, as illustrated in FIG. 19 or FIG. 20, other than as illustrated in FIG. 16. For example, as illustrated in FIG. 19, a laminated structure of protective layer 71/graphene 12/adhesive layer 14 also functioning as the doping layer/second substrate 13 may be used. The protective layer 71 may also function as the transparent layer 51 or the functional layer 52. Also, as illustrated in FIG. 20, a laminated structure of protective layer 71/graphene 12/adhesive layer 14b also functioning as the doping layer/adhesive layer 14a/second substrate 13 may be used. This laminated structure is a structure suitable for the case where the adhesive layer is desired to be thinner because of, for example, the coloring of the adhesive layer also functioning as the doping layer, but cannot be thinner for the purpose of obtaining close contact. Furthermore, in the laminated structure illustrated in FIG. 19, the protective layer 71 and the adhesive layer 14 each may also function as the doping layer. Thus, a laminated structure of protective layer 71 also functioning as the doping layer/graphene 12/adhesive layer 14 also functioning as the doping layer/second substrate 13 may be used. In this laminated structure, the protective layer 71 contains the acid functional group, the acid, the oxidizing agent or the like in a similar manner to the adhesive layer 14, thereby to also function as the doping layer.

The experimental results will be described.

A copper foil is placed in a quartz tube-like furnace of a CVD apparatus heated at 1000° C., and hydrogen ($H_2$) gas and methane ($CH_4$) gas were flown (hydrogen gas flow rate 8 sccm, methane gas flow rate 24 sccm, pressure 0.3 Torr). Thus, graphene was synthesized on the copper foil. After the synthesis, the temperature was decreased while flowing hydrogen gas again. Thereafter, the copper foil on which graphene was synthesized was removed from the quartz tube-like furnace.

Next, the graphene synthesized on the copper foil was spin-coated with a resin including a commercially available UV curable resin. Five types of resins used include a radical-based resin 1, a radical-based resin 2 (SK1120), an epoxy-based resin 3 (manufactured by Asec Co. Ltd., "ACE-TITE" (registered trademark)), an epoxy-based+radical-based resin 4, and an epoxy-based resin 5.

Next, by using a PET film as the second substrate 14, the side of the adhesive layer including the resin applied on the graphene synthesized on the copper foil was directed downward and bonded on this PET film.

Next, the back surface of the PET film was irradiated with UV rays, and the UV rays transmitted through the PET film and were emitted to the adhesive layer for curing. The irradiation condition was an integrated light quantity of 1000 mJ.

Next, the whole of the PET film, the adhesive layer, the graphene and the copper foil was dipped in a 1 M iron nitrate ($FeNO_3$) aqueous solution for 50 minutes, to remove the copper foil by etching.

Thereafter, the whole of the PET film, the adhesive layer and the graphene was washed with ultrapure water and dried.

In the above-described manner, a laminated structure in which the graphene and the PET film are bonded to each other with the adhesive layer was formed.

The measurement results of the sheet resistance and the carrier concentration of the bonded graphene are illustrated in Table 4.

TABLE 4

| Resin | System | Sheet resistance ($\Omega/\square$) | Carrier concentration ($\times 10^{12}/cm^2$) |
| --- | --- | --- | --- |
| Resin 1 | Radical-based | 864 | 3.55 |
| Resin 2 | Radical-based | 983 | 7.32 |
| Resin 3 | Epoxy-based | 986 | 10.6 |
| Resin 4 | Radical-based + Epoxy-based | 560 | 12.7 |
| Resin 5 | Epoxy-based | 492 | 14.8 |

As understood from Table 4, the epoxy-based resins 3 to 5 which generate an acid in the curing process have higher carrier concentrations than the cases where the radical-based resins 1 and 2 are used. This is because the acid generated in the curing process caused doping to be performed to the graphene.

According to the above-described method, the following various advantages can be obtained. That is, the use of the adhesive layer 14 or the protective layer 71 each also functioning as the doping layer can eliminate an independent doping process, thereby achieving low cost. Also, even without the independent doping process, a graphene transparent conductive body having a certain low sheet resistance can be obtained. Also, when doping is performed utilizing the doping process known to the inventors, there has been a problem that the sheet resistance of the treated graphene gradually changes (deteriorates). However, according to this method, the doping state is stable, and the above-described deterioration in the resistance is not caused. Therefore, the electrical characteristics can be stabilized. Also, in the doping process known to the inventors, since the dopant itself is colored, and the amount is more than the dopant amount required for doping, there has been a problem that the transmittance decreases due to the influence of the excess dopant. However, according to this method, a dopant having high transmittance can be used, thereby improving transparency.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 11 first substrate
12 graphene
13 second substrate
14 adhesive layer
51 transparent layer
52 functional layer
53 film
54 display

The invention claimed is:

1. A manufacturing method of a laminated structure, the manufacturing method comprising:
    bonding at least one graphene layer to a second substrate with an adhesive layer to form the laminated structure, wherein
        the adhesive layer comprises a delayed-curing UV curable resin, and
        the adhesive layer has a refractive index $n_2$;
    forming a transparent layer on the at least one graphene layer, wherein
        the transparent layer has a refractive index $n_2$,
        the refractive index $n_1$ and the refractive index $n_2$ satisfy following equation:

$n_1 - n_2 \leq 0.2$; and irradiating the laminated structure with UV rays such that the delayed-curing UV curable resin cures the adhesive layer until at least the laminated structure is wound up around a roll.

2. The manufacturing method of the laminated structure according to claim 1, wherein the adhesive layer is on the second substrate.

3. The manufacturing method of the laminated structure according to claim 1, wherein
    the delayed-curing UV curable resin is a radical polymerization-type UV curable resin, and
    the radical polymerization-type UV curable resin comprises at least one of a thermosetting resin or a cationic polymerization-type UV curable resin.

4. The manufacturing method of the laminated structure according to claim 1, further comprising:
removing a first substrate from the laminated structure, wherein
prior to the removal of the first substrate, the at least one graphene layer is in direct contact with the first substrate, and
the delayed-curing UV curable resin cures the adhesive layer of the laminated structure by the irradiation of the adhesive layer with the UV rays until at least the first substrate is removed from the laminated structure.

5. The manufacturing method of the laminated structure according to claim 1, wherein a time period from the irradiation of the adhesive layer with the UV rays to termination of the curing of the adhesive layer is greater than 10 seconds.

6. The manufacturing method of the laminated structure according to claim 1, wherein
the at least one graphene layer is in direct contact with a first substrate, and
the first substrate is a metal foil.

7. The manufacturing method of the laminated structure according to claim 1, wherein the second substrate is a transparent substrate.

8. The manufacturing method of the laminated structure according to claim 1, wherein
the adhesive layer further comprises volatile matter, and
a content of the volatile matter of the adhesive layer is less than 0.1% by weight.

9. The manufacturing method of the laminated structure according to claim 1, wherein the adhesive layer has a thickness of more than 1 μm and less than 30 μm.

10. The manufacturing method of the laminated structure according to claim 1, wherein the laminated structure is a transparent conductive film.

11. A laminated structure, comprising:
an adhesive layer that comprises a delayed-curing UV curable resin, wherein
the adhesive layer has a refractive index $n_2$;
at least one graphene layer in direct contact with a first surface of the adhesive layer;
a transparent layer on the at least one graphene layer, wherein
the transparent layer has a refractive index $n_1$,
the refractive index $n_1$ and the refractive index $n_2$ satisfy following equation:

$n_1 - n_2 \leq 0.2$; and a second substrate in direct contact with a second surface of the adhesive layer, wherein
the second surface is opposite to the first surface, and
the delayed-curing UV curable resin is configured to cure the adhesive layer of the laminated structure until at least the laminated structure is wound up around a roll.

12. An electronic device, comprising:
a laminated structure comprising:
an adhesive layer that comprises a delayed-curing UV curable resin, wherein
the adhesive layer has a refractive index $n_2$;
at least one graphene layer in direct contact with a first surface of the adhesive layer;
a transparent layer on the at least one graphene layer, wherein
the transparent layer has a refractive index $n_1$,
the refractive index $n_1$ and the refractive index $n_2$ satisfy following equation:

$n_1 - n_2 \leq 0.2$; and a second substrate in direct contact with a second surface of the adhesive layer, wherein
the second surface is opposite to the first surface, and
the delayed-curing UV curable resin is configured to cure, the adhesive layer of the laminated structure until at least the laminated structure is wound up around a roll.

13. The electronic device according to claim 12, wherein the electronic device is at least one of a display or a touch panel.

14. The manufacturing method of the laminated structure according to claim 1, wherein the adhesive layer is on the at least one graphene layer.

15. The manufacturing method of the laminated structure according to claim 1, further comprising:
removing a first substrate from the laminated structure, wherein the at least one graphene layer is in direct contact with the first substrate; and
irradiating the laminated structure with the UV rays such that the delayed-curing UV curable resin cures the adhesive layer after the irradiation of the laminated structure until at least the first substrate is removed from the laminated structure.

16. The manufacturing method of the laminated structure according to claim 1,
wherein the delayed-curing UV curable resin is a semi-curing radical polymerization-type UV curable resin.

* * * * *